UNITED STATES PATENT OFFICE.

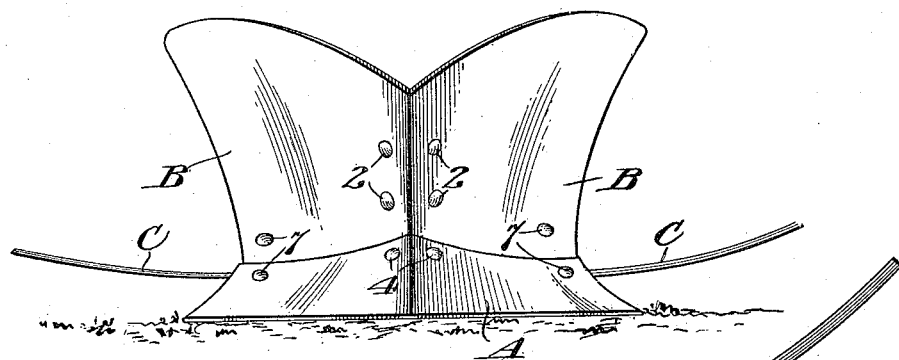
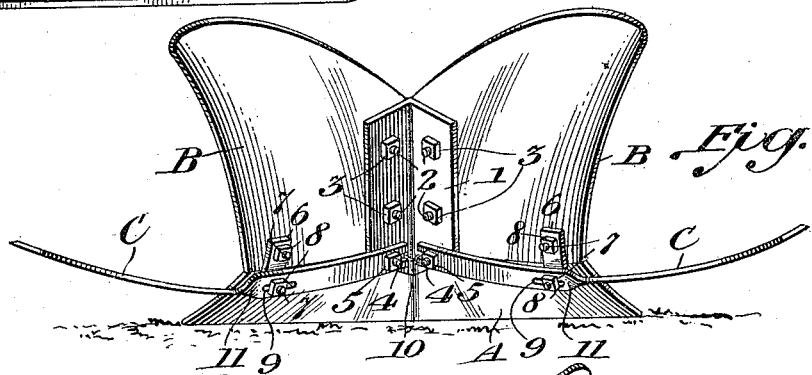
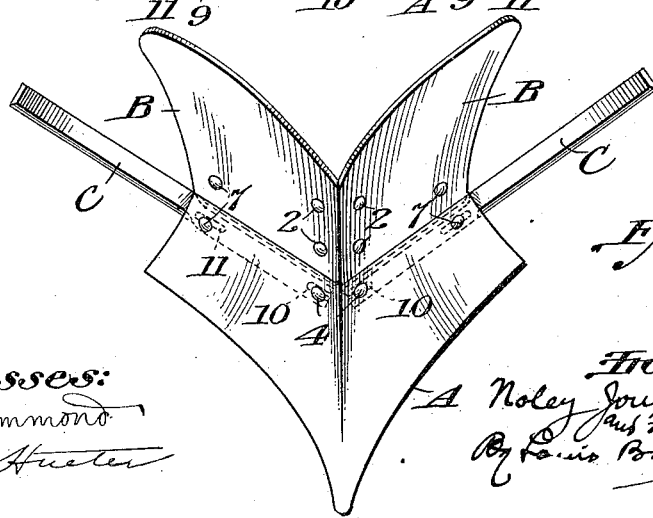

FLOYD S. McCUNE AND NOLEY JONES, OF TULIA, TEXAS.

ATTACHMENT FOR LISTER-PLOWS.

1,132,371. Specification of Letters Patent. Patented Mar. 16, 1915.

Application filed June 19, 1914. Serial No. 846,179.

*To all whom it may concern:*

Be it known that we, FLOYD S. McCUNE and NOLEY JONES, citizens of the United States, residing at Tulia, in county of Swisher and State of Texas, have invented certain new and useful Improvements in Attachments for Lister-Plows, of which the following is a specification.

This invention relates to an improvement in attachments for listers, plows, and the like, and the object is to provide means for removing the weeds on each side of the furrow formed by the lister plow.

The lister plow, in making the furrow, throws the earth up on each side, covering weeds or other growth, which growth has a tendency to smother and affect the growth of the seeding. To overcome these objections, provision is made by means of blades which radiate from the share of the plow on each side, for penetrating the surface to a depth of practically two inches for the purpose of cutting the weeds beneath the surface, and thereby eliminating the growth of the weeds along the rows of seeding.

It has been demonstrated that blades which extend outwardly from the share and at right angles thereto are objectionable, because they produce a drag or add to the draft of the plow. It has been further demonstrated that with blades or knives which extend from the share and lie in a horizontal plane, there is a tendency to cause a vibration, that is, the knives, in producing the cut into the earth along the furrows, will vibrate, and this vibration tends to draw the point of the lister upward, affecting the formation of the furrow, and maintaining the plow at the depth desired. With this invention, such objections are overcome, because the knives or blades are so located with respect to the share and mold board that they will penetrate the surface practically to a depth say of two inches. These blades lie in a horizontal plane, and are formed in the shape of an arc of a circle, so that the outer ends or terminals of the blades come to, or penetrate through, the surface. By forming the blades in such a manner there is no possibility of producing any vibration, nor will the soil be thrown up and act on the principle of a mold board, thereby adding to the draft of the plow.

The invention relates to still other novel features of construction and combinations of parts which will be hereinafter more fully described and pointed out in the claims.

In the accompanying drawings: Figure 1 is a view in front elevation; Fig. 2 is a view in rear elevation, showing the invention applied to the share of a plow; and Fig. 3 is a view of one of the knives in elevation.

A represents the share of the lister plow, and B, B are the mold board wings. The wings B, B are connected together by an angle iron strip or shoe 1, by means of bolts 2 and nuts 3. The share A is connected to the angle iron strip by means of bolts 4 and nuts 5. The outer upper edges of the share, and the outer lower edges of the wings are connected together by means of plates 6, bolts 7 passing through the wings and share, and through the plate 6 for fastening the wings and share together. Nuts 8 are screwed upon the bolts for fastening the parts together.

Connected to the share and on the under side thereof are knives or blades C. These blades are provided with an elongated slot 9, through which the bolt 7 passes for fastening the knife to the share. The inner ends of the knives are provided with a slot 10, through which the bolts 4 extend for fastening the knives to the share. These knives are preferably bent or twisted as at 11, for causing the blades to extend in practically a horizontal plane in transverse section. The forward edges are sharpened, producing cutting edges. The cutting edges are preferably made parallel with the parallel cutting edge of the share. The cutting portion of the blades is in the form of an arc of a circle, and is preferably an inch-and-a-half in width. The blades are made of open hearth plow steel, so that they can be bent or flexed for increasing or decreasing the arc of the circle, it depending entirely upon the depth of the furrow. If a deep furrow is to be made, the arc of the circle should be greater. It is necessary, however, that these blades be located above the cutting edge of the share, so that they will make a cut of practically two inches below the surface for the purpose of cutting the weeds at their roots so that they will be eliminated and act in the manner of a cultivator. By this means it is unnecessary to cultivate the field before the seeding has reached its growth for cultivation.

We claim:

1. In a lister plow, the combination with a plow share having a mold board, connected thereto, of knives connected to the share above the cutting edge thereof and extending therefrom in the arc of a circle, said knives lying in a horizontal plane.

2. In a lister plow, the combination with a share and mold board, means for connecting the mold board and share together, of knives having one terminal thereof lying parallel to the share and provided with slots whereby the said knives are connected to the share by said connecting means, said knives having the cutting edges thereof bent so that they lie in a horizontal plane in transverse section and are formed in the arc of a circle.

In testimony whereof, we affix our signatures in the presence of two witnesses.

FLOYD S. McCUNE.
NOLEY JONES.

Witnesses as to Floyd S. McCune:
  S. E. WEST,
  R. T. BISHOP.

Witnesses as to Noley Jones:
  WATTS F. ESTABROOK,
  WM. H. DeLACY.

Copies of this patent may be obtained for five cents each, by addressing the "Commissioner of Patents, Washington, D. C."